(12) United States Patent
Vollrath et al.

(10) Patent No.: US 7,375,792 B2
(45) Date of Patent: May 20, 2008

(54) APPARATUS FOR MEASURING FEATURE WIDTHS ON MASKS FOR THE SEMICONDUCTOR INDUSTRY

(75) Inventors: Wolfgang Vollrath, Burbach (DE); Frank Hillmann, Deggendorf (DE); Gerd Scheuring, Munich (DE); Hans-Jürgen Brueck, Munich (DE)

(73) Assignees: Leica Microsystems Semiconductor GmbH, Wetzlar (DE); MueTec Automatisierta Mikroskopie und Messtechnik GmbH, Munich (DE)

( * ) Notice: Subject to any disclaimer, the term of this patent is extended or adjusted under 35 U.S.C. 154(b) by 628 days.

(21) Appl. No.: 10/711,424

(22) Filed: Sep. 17, 2004

(65) Prior Publication Data
US 2005/0084770 A1 Apr. 21, 2005

(51) Int. Cl.
*G03B 27/42* (2006.01)
(52) U.S. Cl. .......................................... 355/53; 355/77
(58) Field of Classification Search ................... 355/53, 355/67, 77
See application file for complete search history.

(56) References Cited

U.S. PATENT DOCUMENTS

| 4,008,967 | A | 2/1977 | Kiemle | ....................... 356/239 |
|---|---|---|---|---|
| 7,130,037 | B1* | 10/2006 | Lange | ...................... 356/237.2 |
| 2003/0053037 | A1 | 3/2003 | Blaesing-Bangert et al. | .. 355/53 |
| 2004/0065517 | A1* | 4/2004 | Watson et al. | .............. 188/378 |
| 2005/0052642 | A1* | 3/2005 | Shibata et al. | ........... 356/237.1 |

FOREIGN PATENT DOCUMENTS

| DE | 2441336 | 3/1976 |
|---|---|---|
| DE | 206 607 | 2/1984 |
| DE | 221 563 | 4/1985 |
| DE | 101 40 174 | 3/2003 |
| JP | 56113115 | 9/1981 |

* cited by examiner

*Primary Examiner*—D. Rutledge
(74) *Attorney, Agent, or Firm*—Simpson & Simpson, PLLC

(57) ABSTRACT

An apparatus for measuring feature widths on masks 1 for the semiconductor industry is disclosed. The apparatus encompasses a carrier plate 16 that is retained in vibrationally decoupled fashion in a base frame 14; a scanning stage 18, arranged on the carrier plate 16, that carries a mask 1 to be measured, the mask 1 defining a surface 4; and an objective 2 arranged opposite the mask 1. A liquid 25 is provided between the objective 2 and the surface 4 of the mask 1.

22 Claims, 5 Drawing Sheets

1

APPARATUS FOR MEASURING FEATURE WIDTHS ON MASKS FOR THE SEMICONDUCTOR INDUSTRY

CROSS REFERENCE TO RELATED APPLICATIONS

This application claims priority of the German patent application 103 43 876.9, filed Sep. 23, 2003, which is incorporated by reference herein.

FIELD OF THE INVENTION

The invention concerns an apparatus for measuring feature widths on masks for the semiconductor industry.

BACKGROUND OF THE INVENTION

The established existing art for the optical measurement of feature widths on masks of the semiconductor industry is the use of microscopes in the visual (VIS), ultraviolet (UV), and deep ultraviolet (DUV) spectral regions using dry objectives. Dry objectives are characterized in that air is present between the specimen and the first optical surface of the microscope objective immediately adjacent to the specimen. As a consequence of this, the theoretical maximum possible numerical aperture NA is equal to 1; in practice, values of at most NA≈0.95 are attainable, and have in fact been achieved. The scope for higher apertures, i.e. higher resolution, has thus been exhausted.

SUMMARY OF THE INVENTION

It is the object of the invention to create an apparatus that extends the optical measurement of feature widths on masks to smaller feature widths than are possible with conventional optical feature width measurement.

The object is achieved by an apparatus for measuring feature widths on masks for the semiconductor industry, comprising a carrier plate that is retained in vibrationally decoupled fashion in a base frame; a scanning stage, arranged on the carrier plate, wherein the carrier plate carries the mask to be measured; an objective arranged opposite a surface of the mask; and a liquid is provided between the objective and the surface of the mask.

It is a further object of the invention to create an apparatus that extends the optical measurement of feature widths on semiconductor substrates to smaller feature widths than are possible with conventional optical feature width measurement.

The object is achieved by an apparatus for measuring feature widths on semiconductor substrates, comprising a carrier plate that is retained in vibrationally decoupled fashion in a base frame; a scanning stage, arranged on the carrier plate, wherein the carrier plate carries the semiconductor substrate to be measured; an objective arranged opposite a surface of the semiconductor substrate, wherein the wherein objective is configured for wavelengths of the illuminating light smaller than 300 nm; and a liquid is provided between the objective and the surface of the semiconductor substrate.

The apparatus for measuring feature widths on masks for the semiconductor industry encompasses a carrier plate that is retained in vibrationally decoupled fashion in a base frame.

The mask is arranged on a scanning stage arranged on the carrier plate. The mask has a surface opposite which an objective is positioned. A liquid is provided between the objective and the surface of the mask.

Associated with the objective, in one embodiment, is a precision metering nozzle that applies the liquid exclusively onto at least one measurement point defined on the surface of the mask.

In a further advantageous embodiment of the invention, the objective possesses a device for applying the liquid exclusively onto at least one measurement point defined on the surface of the mask. The device can be embodied, in this context, as a cylinder that completely surrounds the objective, the cylinder being separated from the objective by a gap. In a further advantageous embodiment of the invention, the device is made up of at least one conduit that is arranged coaxially around the circumference of the objective.

A further possibility is that the liquid completely covers the surface of the mask. The mask is placed, in this context, in a special frame, and the mask rests on a special peripheral seal.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which.

DETAILED DESCRIPTION OF THE INVENTION

The specification below refers exclusively to masks. It has to be understood that the term mask is not limited to the masks exclusively. Mask may be understood as well as semiconductor substrates like a wafer.

Figure 1:
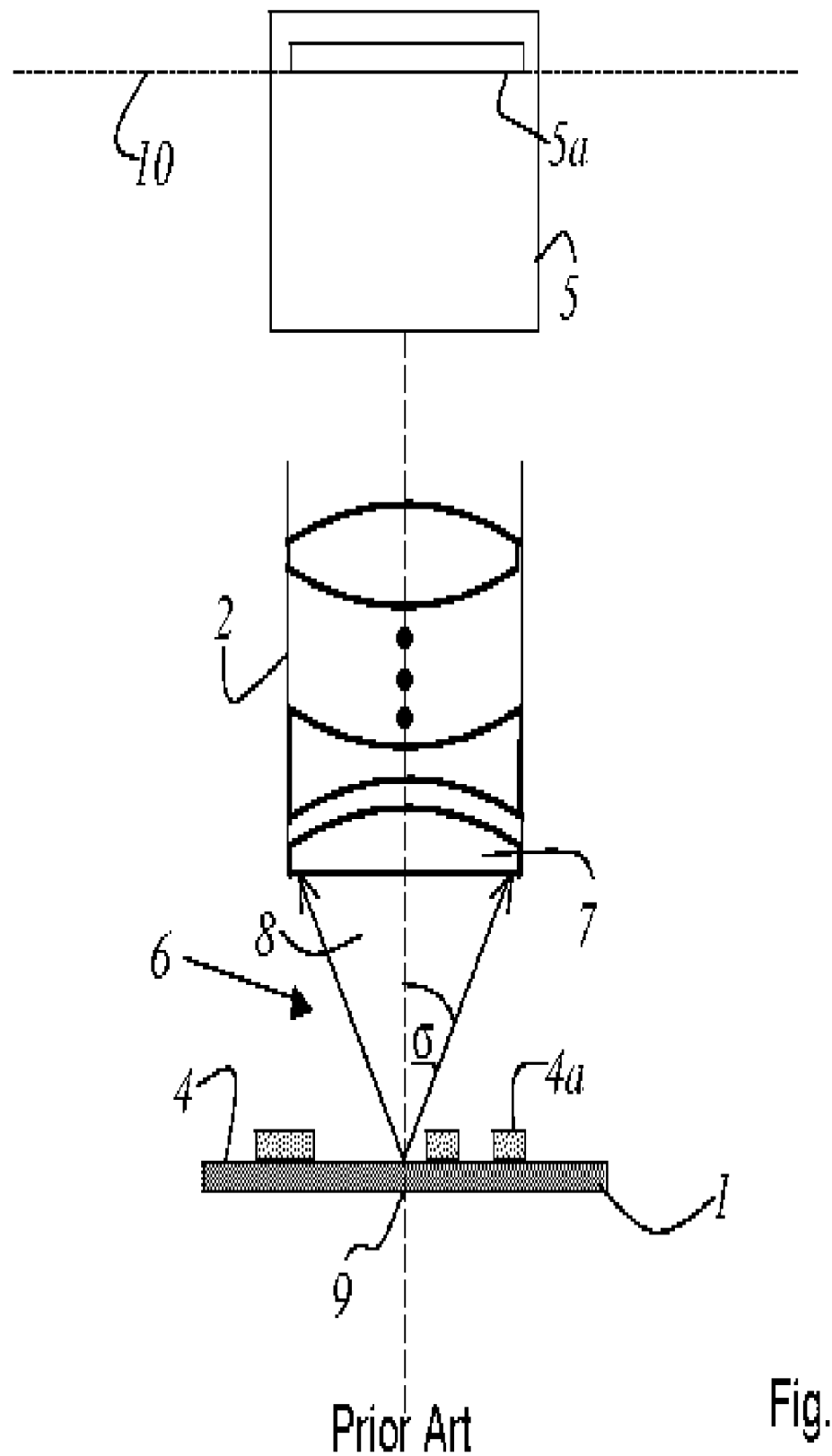
FIG. 1 schematically depicts a dry objective (according to the prior art) in relation to a surface having features to be measured.

FIG. 1 schematically depicts a dry objective 2 (according to the existing art) in relation to a surface 4 having features 4a to be measured. What is meant in this connection by "measurement of feature widths" is that the image of a feature 4a or line to be measured on a mask 1 for semiconductor production is imaged by means of a high-resolution optical system onto receiving surface 5a of a CCD camera 5. CCD camera 5 acquires the intensity profile of the linear image, and the line width of the acquired linear feature is determined therefrom using suitable image analysis software. It is thus possible to measure each line or feature 4a on mask 1 for semiconductor manufacture individually, and to determine the line width. The resolution achievable with an optical system 2 is responsible for the smallest line width still measurable with the system. A characteristic magnitude of an imaging optical system, or objective 2, that is critical in terms of resolution capability can be determined using the following equation:

$$P_{\lambda/2} > 0.25(\lambda/NA),$$

where $P_{\lambda/2}$ is the smallest line width that can still be resolved, $\lambda$ the wavelength of the light used for illumination, and NA the numerical aperture of the imaging optical system or objective 2. The numerical aperture is further defined as NA=n sin($\sigma$), where n is the refractive index of medium 6 between objective 2 and surface 4 of mask 1. Objective 2 is usually made up of several elements, so that n is the refractive index of medium 6 between the one front element 7 of objective 2 and mask 1. $\sigma$ is the semiaperture angle of the largest light cone angle 8 that can be transmitted (proceeding from a specimen point 9) into image plane 10, i.e. receiving surface 5a of CCD camera 5. It is evident from FIG. 1 that the aperture angle or semiaperture angle $\sigma$ can be a maximum of 90 degrees, and sin($\sigma$) can thus be a maximum of 1. As a result of manufacturing tolerances that must be observed, however, values of sin ($\sigma$) only ≦0.95 are attainable in practice for objectives for purely visual observation. Even more stringent manufacturing tolerances must be observed for objective 2 for the measurement of features 4a, so that for this, values of sin ($\sigma$)≈0.90 are almost impossible to exceed. This means that it is no longer possible to enhance resolution by increasing the aperture angle. Given a fixed predefined wave length $\lambda$, the only way to do so is to increase the refractive index n. This means that a medium 6 having a refractive index greater than that of air is used between surface 4a of mask 4 and front element 7 of objective 2.

Figure 2:
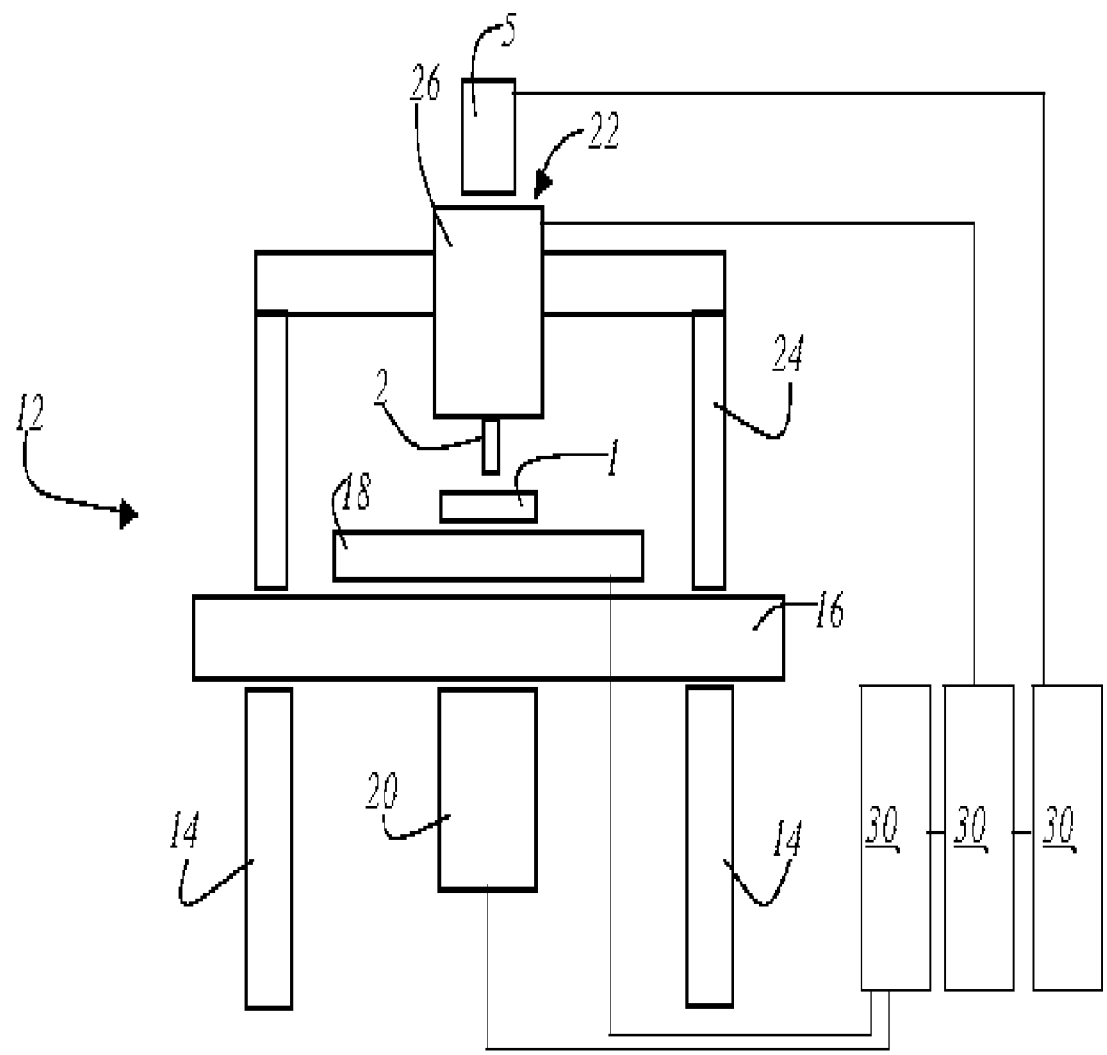
FIG. 2 schematically depicts an embodiment of an apparatus for measuring feature widths.

FIG. 2 schematically depicts an embodiment of an apparatus 12 for measuring line widths of features 4a on surface 4 of a mask 1. Apparatus 12 comprises a base frame 14 in which a carrier plate 16 is retained in vibrationally decoupled fashion. Arranged on carrier plate 16 is a scanning stage 18 that carries mask 1 to be measured. In the embodiment depicted here, mask 1 is transilluminated by a transmitted illumination unit 20. An imaging microscope unit 22 is arranged above mask 1. Imaging microscope unit 22 is retained in a carrier unit 24 that itself is connected rigidly to carrier plate 16. Objective 2 is arranged on imaging microscope unit 22 in such a way that it is located opposite mask 1. The image of mask 1 acquired by objective 2 is imaged onto CCD camera 5. Focusing can be performed either by way of a vertical displacement of scanning stage 18 or by way of a vertical displacement, integrated into microscope unit 22, of objective 2. In addition to transmitted illumination unit 20, an incident illumination unit 26 can be provided as an internal or external component of microscope unit 22. Apparatus 12 furthermore encompasses several electronics units 30, for example a stage control system and CCD readout unit as well as a PC for evaluation and operation.

Figure 3:
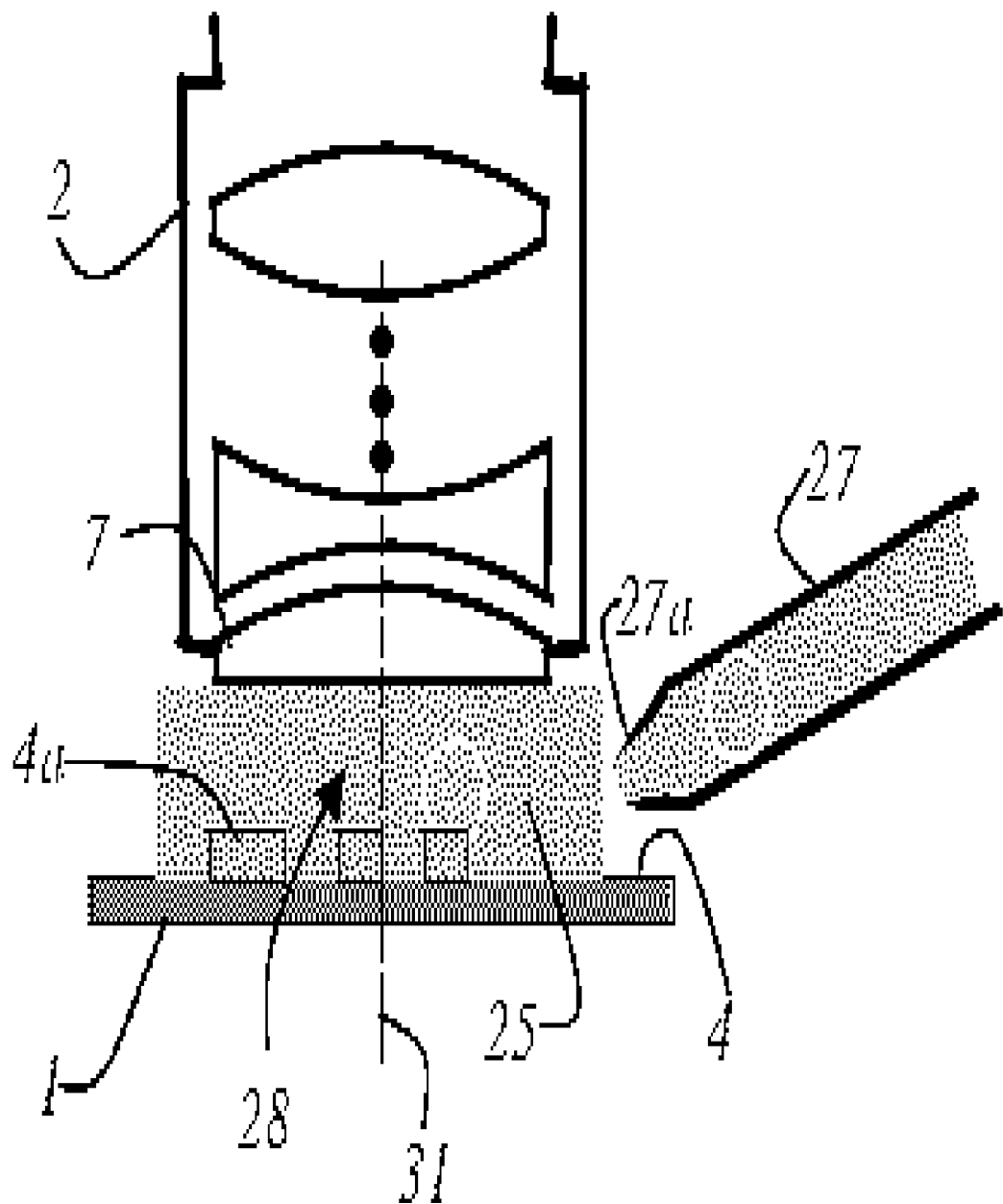
FIG. 3 schematically depicts a first embodiment of an objective in spatial relation to the feature widths to be measured on the surface of a mask for semiconductor manufacture, a liquid being provided between the objective and the surface of the mask for semiconductor manufacture.

FIG. 3 schematically depicts a first embodiment of an objective 2 in spatial relation to the width of features 4a to be measured on surface 4 of a mask 1 for semiconductor manufacture. The invention exploits the fact that the use of liquids 25 ("immersion media") between mask 1 and objective 2 allows the effective (numerical) aperture NA to be increased above the value of 1, and thus results in higher resolution. The numerical aperture NA is obtained by multiplying the refractive index n of the immersion medium by the sine of the aperture angle $\sigma$: n*sin($\sigma$). The relationship between NA and the smallest resolvable feature width $\Delta$ is $P_{\lambda/2} > 0.25*\lambda/NA$, where $\lambda$ is the wavelength of the light. For air, n=1 (see FIG. 1, existing art); when liquids 25 are used, refractive indices n>1.2 are possible, so that a proportional increase in resolution is thereby achieved.

The use of liquids 25 in the measurement of masks was considered taboo in the existing art because of the risk of contaminating mask 1. For that reason, this approach to higher resolution was not previously taken, or was generally ruled out as unacceptable in the search for new, higher-resolution solutions.

One possibility for liquid 25 as an immersion medium is water. Objective 2 is preferably configured for the deep ultraviolet (DUV) spectral region at a wavelength below 300 nm, e.g. 248 nm. Objective 2 can likewise be embodied for specific applications, but also for wavelengths greater than 300 nm. In addition to water as an ideal immersion medium, other liquids such as inert oils, for example Fomblin®, a perfluoropolyether oil, can also be used.

In the approach described here, a liquid 25 is provided between objective 2 and surface 4 of mask 1 for semiconductor manufacture. Liquid 25 wets both surface 4 of mask 1 and front element 7 of objective 2. The liquid can be applied only in targeted and local fashion to measurement point 28 of mask 1 that is to be measured at that time; alternatively, however, wetting of the entire mask surface 4 is also conceivable. FIG. 3 depicts a first possibility for targeted application. For targeted application, a precision metering nozzle 27 is provided in the immediate vicinity of objective 2. Measurement point 28 of mask 1 is always positioned in the immediate vicinity of an optical axis 31 defined by objective 2, i.e. in the field of view of objective 2. As a rule, the spacing between mask 1 and objective 2 is not large enough to allow liquid 25 to be applied with the nozzle in targeted fashion on measurement point 28. In that case measurement point 28 is first positioned under tip 27a of precision metering nozzle 27. A droplet of liquid 25 is then applied onto measurement point 28. Mask 1 is then displaced, using scanning stage 20, in such a way that the liquid droplet and thus measurement point 28 are located beneath objective 2. Objective 2 is lowered, or alternatively mask 1 is raised, so that front element 7 of the objective is also wetted by liquid 25.

Figure 4:
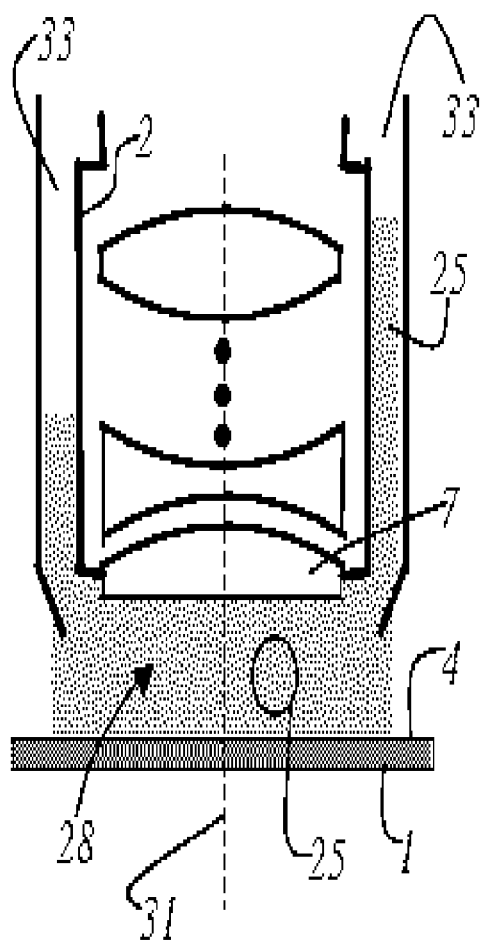
FIG. 4 schematically depicts a second embodiment of an objective having a device for applying a liquid onto the surface of a mask for semiconductor manufacture.
Figure 5A:
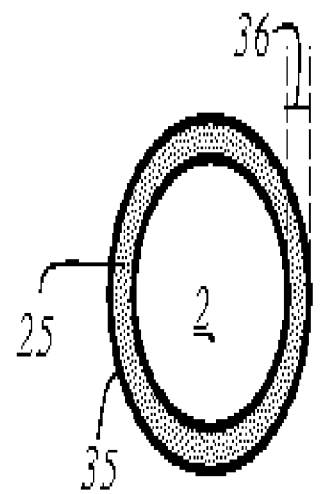
FIG. 5a shows a first embodiment of the device for applying the liquid.
Figure 5B:
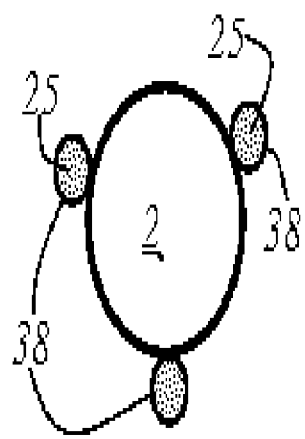
FIG. 5b shows a second embodiment of the device for applying the liquid.

FIG. 4 schematically depicts a second embodiment of an objective 2 having a device 33 for applying liquid 25 onto surface 4 of mask 1 for semiconductor manufacture. Device 33 for applying liquid 25 is arranged symmetrically around optical axis 31 of objective 2. As depicted in FIG. 5a, device 33 is embodied as cylinder 35 that completely surrounds objective 2. Cylinder 35 possesses a larger diameter than objective 2, so that a gap 36 is created. Through gap 36, liquid 25 is transported to measurement point 28. In FIG. 5b, device 33 for applying liquid 25 is embodied as at least one conduit 38. One or more conduits 38 are arranged coaxially around the circumference of objective 2. Through the one or more conduits 38, liquid 25 is applied in suitable fashion onto surface 4 of mask 1.

Figure 6:
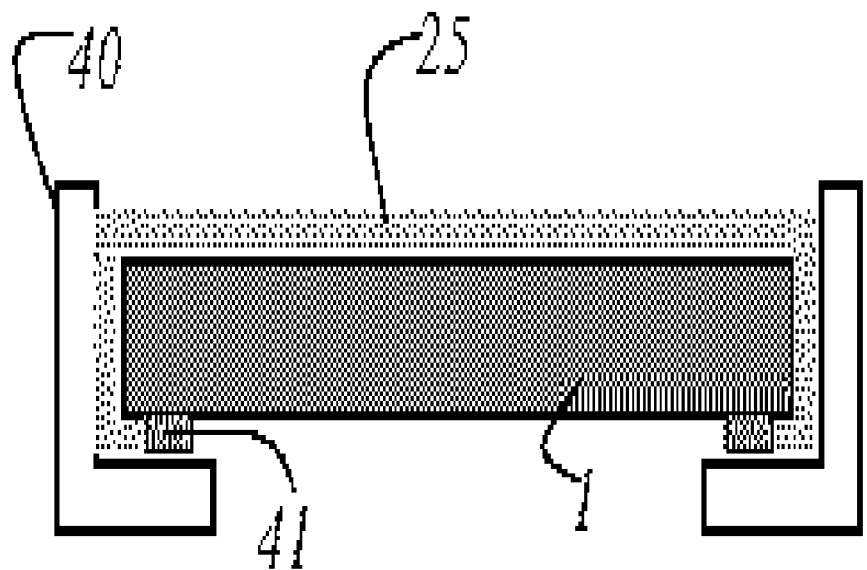
FIG. 6 shows a further embodiment of a system for applying a liquid onto the surface of a mask for semiconductor manufacture.

FIG. 6 shows a further embodiment of a system for applying a liquid 25 onto surface 4 of a mask 1 for semiconductor manufacture. In this embodiment, liquid 25 is distributed over the entire surface 4 of mask 1 for the measurement. Mask 1 is placed for that purpose in a special frame 40. Mask 1 rests, in this context, on a special peripheral seal 41, so that liquid 25 is distributed over the entire surface 4 of mask 1 and is securely held in frame 40. Seal 41 is made, for example, of Teflon® material.

The invention has been described with regard to the preferred exemplary embodiments. It is self-evident to one skilled in the art that changes and modifications can be made without leaving the range of protection of the claims below.

What is claimed is:

1. An apparatus for measuring feature widths on masks for the semiconductor industry, comprising a carrier plate that is retained in vibrationally decoupled fashion in a base frame; a scanning stage, arranged on the carrier plate, wherein the carrier plate carries the mask to be measured; an objective arranged opposite a surface of the mask; a liquid is provided between the objective and the surface of the mask, and wherein a precision metering nozzle, which applies the liquid exclusively onto at least one measurement point located on the surface of the mask, is associated with the objective.

2. An apparatus for measuring feature widths on masks for the semiconductor industry, comprising:
   a base frame;
   a carrier plate retained in a vibrationally decoupled fashion in the base frame;
   a mask comprising a surface;
   an objective arranged opposite the surface of the mask;
   a scanning stage operatively arranged on the carrier plate to carry the mask;
   a device associated with the objective, operatively arranged to apply a liquid between the objective and the surface of the mask.

3. The apparatus as recited in claim 2 wherein the mask further comprises at least one measurement point on the surface, and the device is operatively arranged to apply the liquid exclusively onto the at least one measurement point.

4. The apparatus as recited in claim 2 wherein the device comprises a precision metering nozzle.

5. The apparatus as recited in claim 2 wherein the device is integral to the objective.

6. The apparatus as recited in claim 5 wherein the device comprises a cylinder completely surrounding the objective and separated from the objective by a gap.

7. The apparatus as recited in claim 6 wherein the liquid is transportable through the gap.

8. The apparatus as recited in claim 5 wherein the objective comprises a circumference and the device comprises at least one conduit arranged coaxially with the circumference of the objective.

9. The apparatus as recited in claim 8 wherein the liquid is transportable through the at least one conduit.

10. The apparatus as recited in claim 9 wherein the device comprises three conduits.

11. The apparatus as recited in claim 2 further comprising a special frame and a special peripheral seal, wherein the mask is arranged in the special frame and on the special peripheral seal, and wherein the liquid applied to the surface is securely contained within the special frame.

12. The apparatus as recited in claim 11 wherein the special seal comprises polytetrafluoroethylene.

13. The apparatus as recited in claim 2 wherein the liquid comprises water.

14. The apparatus as recited in claim 2 wherein the liquid comprises oil.

15. The apparatus as recited in claim 2 wherein the objective is configured for wavelengths of the illuminating light smaller than 300 nm.

16. The apparatus as recited in claim 2 wherein the objective is configured for wavelengths of the illuminating light smaller than 248 nm.

17. The apparatus as recited in claim 2 wherein the objective is wetted with the liquid.

18. An apparatus for measuring feature widths on semiconductor substrates, comprising:
    a base frame;
    a carrier plate retained in a vibrationally decoupled fashion in the base frame;
    a semiconductor substrate comprising a surface;
    an objective arranged opposite the surface of the semiconductor substrate;
    a scanning stage operatively arranged on the carrier plate to carry the semiconductor substrate;
    a device associated with the objective, operatively arranged to apply a liquid between the objective and the surface of the semiconductor substrate.

19. The apparatus as recited in claim 18 wherein the semiconductor substrate further comprises at least one measurement point on the surface, and the device is operatively arranged to apply the liquid exclusively onto the at least one measurement point.

20. The apparatus as recited in claim 18 wherein the objective is configured for wavelengths of the illuminating light smaller than 300 nm.

21. The apparatus as recited in claim 18 wherein the objective is configured for wavelengths of the illuminating light smaller than 248 nm.

22. The apparatus as recited in claim 18 wherein the objective is wetted with the liquid.

* * * * *